United States Patent
Suzuki

(10) Patent No.: US 10,055,724 B2
(45) Date of Patent: Aug. 21, 2018

(54) SALES PROCESSING APPARATUS, SALES PROCESSING METHOD AND SALES PROCESSING SYSTEM

(71) Applicant: TOSHIBA TEC KABUSHIKI KAISHA, Shinagawa-ku, Tokyo (JP)

(72) Inventor: Yasuyuki Suzuki, Shizuoka-ken (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 863 days.

(21) Appl. No.: 13/968,510

(22) Filed: Aug. 16, 2013

(65) Prior Publication Data

US 2014/0067576 A1 Mar. 6, 2014

(30) Foreign Application Priority Data

Sep. 6, 2012 (JP) .................................. 2012-196199
Jun. 14, 2013 (JP) .................................. 2013-125261

(51) Int. Cl.
*G07G 1/12* (2006.01)
*G07G 5/00* (2006.01)
(Continued)

(52) U.S. Cl.
CPC ....... *G06Q 20/209* (2013.01); *G06Q 20/0655* (2013.01); *G06Q 20/387* (2013.01); *G07F 17/42* (2013.01)

(58) Field of Classification Search
None
See application file for complete search history.

(56) References Cited

U.S. PATENT DOCUMENTS 7,778,924 B1* 8/2010 Ananda ............. G07B 17/0008
705/50
2003/0028801 A1* 2/2003 Liberman ............. G06F 17/211
726/31
(Continued)

FOREIGN PATENT DOCUMENTS

| JP | 2001-184400 | 7/2001 |
| JP | 2002-208038 | 7/2002 |
| JP | 2005-316579 | 11/2005 |

OTHER PUBLICATIONS

Japanese Office Action for Japanese Application No. 2013-125261 dated Jun. 23, 2015.

*Primary Examiner* — Ariel J Yu
(74) *Attorney, Agent, or Firm* — Amin, Turocy & Watson LLP

(57) ABSTRACT

In accordance with an embodiment, a sales processing apparatus includes a first generation unit, a second generation unit, a display control unit and a printer control unit. The first generation unit configured to generate a paper surface image of a valuable instrument visibly including all the right code necessary for exercising the right, the paper surface is relating to the right obtained by customer paying a consideration. The second generation unit configured to generate a preview image invisibly including the right code. The display control unit configured to control a display device to display the preview image. The printer control unit configured to control a printer to print the paper surface image on a printing medium in response to a request for issuing a valuable instrument of the surface representing by the preview image displayed by the display device.

9 Claims, 3 Drawing Sheets

(51) Int. Cl.
*G06Q 30/00* (2012.01)
*G06Q 20/20* (2012.01)
*G07F 17/42* (2006.01)
*G06Q 20/06* (2012.01)
*G06Q 20/38* (2012.01)

(56) References Cited

U.S. PATENT DOCUMENTS

| | | | | |
|---|---|---|---|---|
| 2004/0038705 | A1* | 2/2004 | Katayama | G06F 3/0481 455/550.1 |
| 2006/0144924 | A1* | 7/2006 | Stover | G06Q 20/042 235/379 |
| 2007/0260522 | A1* | 11/2007 | Bice | G06Q 20/387 705/14.26 |
| 2008/0027810 | A1* | 1/2008 | Lerner | G06Q 30/02 705/14.25 |
| 2012/0271733 | A1* | 10/2012 | Brooks | G06Q 20/28 705/26.5 |

\* cited by examiner

FIG.4

COMMODITY NAME: NET SHOP XXX    ELECTRONIC PREPAID COUPON

ISSUER: NET SHOP XXX

AMOUNT: $ 5,000

PIN CODE: ABCD-1234-efgh-5678

BECOME AVAILABLE BY INPUTTING PIN CODE ON WEBSITE OF XXX.

FIG.5

COMMODITY NAME: NET SHOP XXX    ELECTRONIC PREPAID COUPON

ISSUER: NET SHOP XXX

AMOUNT: $ 5,000

PIN CODE: **---**

BECOME AVAILABLE BY INPUTTING PIN CODE ON WEBSITE OF XXX.

ISSUE YOUR COUPON, OK?

CAN NOT ACCEPT REFUNDMENT OR CANCEL AFTER ISSUING.

YES    NO

SALES PROCESSING APPARATUS, SALES PROCESSING METHOD AND SALES PROCESSING SYSTEM

CROSS-REFERENCE TO RELATED APPLICATION

The present application is based upon and claims the benefit of priorities from Japanese Patent Application No. 2012-196199 filed on Sep. 6, 2012 and Japanese Patent Application No. 2013-125261 filed on Jun. 14, 2013, the entire contents of which are hereby incorporated by reference.

FIELD

Embodiments described herein relate to a sales processing apparatus, a sales processing method and a sales processing system.

BACKGROUND

Server-managed electronic money, a prepaid virtual currency, is a settlement unit in a commodity transaction on the net.

A customer desiring to make a payment with server-managed electronic money purchases unique identification information, that is, a prepaid number, in an entity shop such as a convenience store in advance. The prepaid number is endowed with a specified amount on a server. Such a prepaid number is marked on a printed sheet (voucher or valuable instrument) and then delivered to a user.

Afterwards, the customer inputs the purchased prepaid number in an input column set on a settlement screen in the commodity transaction on the net. BY the input, the prepaid amount endowed to the prepaid number is paid for a commodity transaction. That is, purchasing a prepaid number is equivalent to purchasing a right for paying with virtual currency.

When a prepaid number is sold, a sales processing apparatus such as a POS terminal acquires the prepaid number from a server, prints the prepaid number on a sheet medium, and issues a voucher (valuable instrument) on which the prepaid number is written.

BRIEF DESCRIPTION OF THE DRAWINGS

FIG. 4 is a diagram illustrating an example of a paper surface image; and

FIG. 5 is a diagram illustrating an example of a confirmation screen.

DETAILED DESCRIPTION

In accordance with an embodiment, a sales processing apparatus includes a first generation unit, a second generation unit, a display control unit and a printer control unit. The first generation unit configured to generate a paper surface image of a valuable instrument visibly including all the right code necessary for exercising the right, the paper surface is relating to the right obtained by customer paying a consideration. The second generation unit configured to generate a preview image invisibly including the right code. The display control unit configured to control a display device to display the preview image. The printer control unit configured to control a printer to print the paper surface image on a printing medium in response to a request for issuing a valuable instrument of the surface representing by the preview image displayed by the display device.

An example of the embodiment is described below with reference to accompanying drawings. Moreover, a POS (point-of-sale) terminal is described as an example of a sales processing apparatus in the present embodiment.

Figure 1:
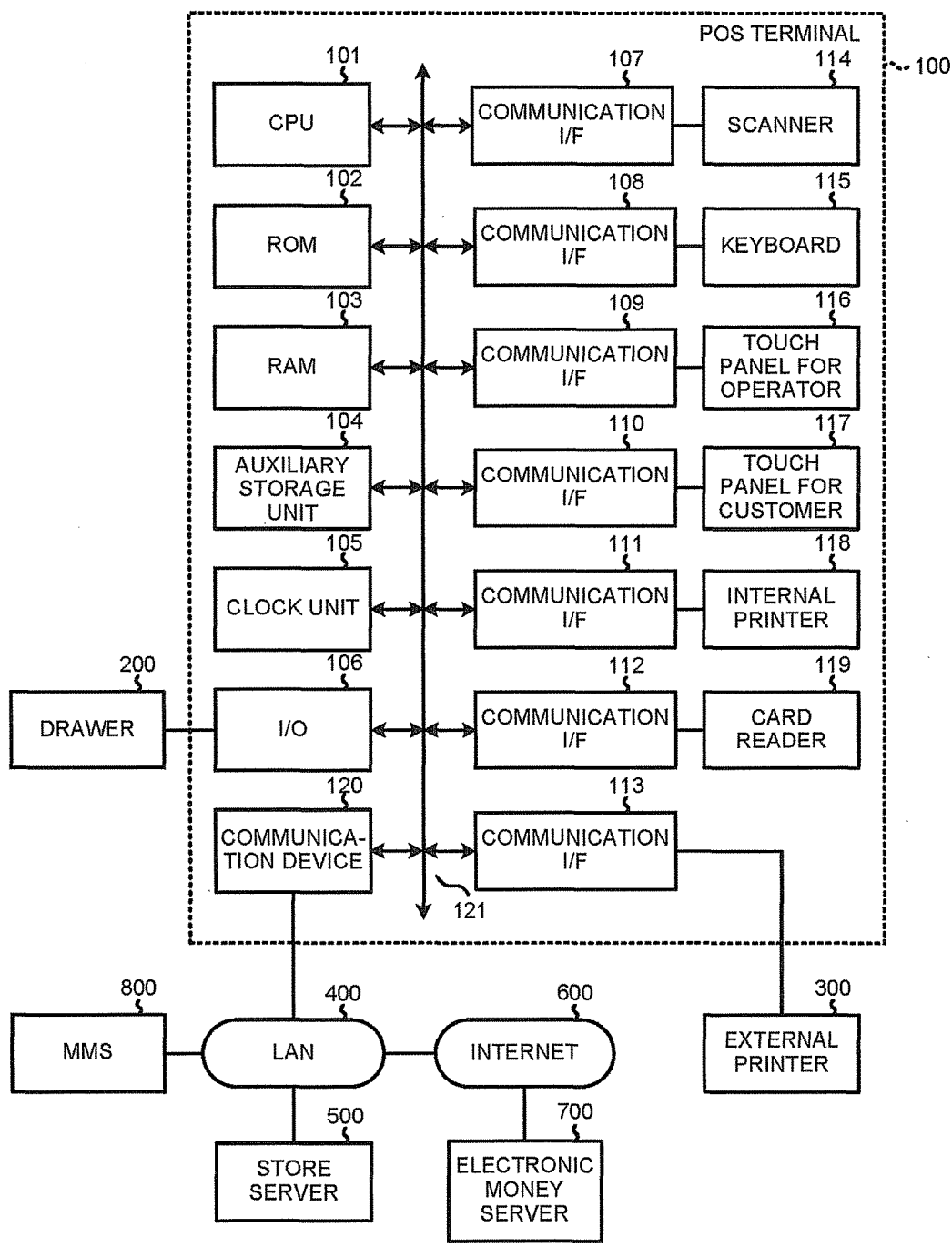
FIG. 1 is a block diagram of a POS terminal according to one embodiment.

FIG. 1 is a block diagram of a POS terminal 100.

The POS terminal 100 includes a CPU (central processing unit) 101, a ROM (read-only memory) 102, a RAM (random-access memory) 103, an auxiliary storage unit 104, a clock unit 105, an input/output port (I/O) 106, communication interfaces (communication I/F) 107, 108, 109, 110, 111, 112 and 113, a scanner 114, a keyboard 115, a touch panel for operator 116, a touch panel for customer 117, an internal printer 118, a card reader 119 and a communication device 120. Moreover, the CPU 101, the ROM 102, the RAM 103, the auxiliary storage unit 104, the clock unit 105, the input/output port (I/O) 106, the communication interfaces 107-113 and the communication device 120 are connected with a bus line 121, respectively.

The CPU 101 controls each section based on an operating system, middleware and application program stored in the ROM 102 and the RAM 103 to achieve various actions of the POS terminal 100.

The ROM 102 stores the aforementioned operating system. The ROM 102 sometimes stores the middleware and the application program as well. Besides, the data which is referred to by the CPU 101 to carry out various processing is sometimes stored in the ROM 102.

The data which is referred to by the CPU 101 to carry out various processing is stored in the RAM 103. In addition, the RAM 103 is used as a so-called working area which stores the data temporarily used by the CPU 101 to carry out various processing.

The auxiliary storage unit 104 is, for example, an HDD (hard disk drive) or a SSD (solid state drive) and the like, and stores the data used by the CPU 101 to carry out various processing or the data generated from the processing of the CPU 101.

The application program stored in the ROM 102, the RAM 103 or the auxiliary storage unit 104 includes a coupon issuing program describing the coupon issuing processing which will be described later. When the coupon issuing program is stored in the RAM 103 or the auxiliary storage unit 104, the POS terminal 100 is generally transferred in such a state that the coupon issuing program is stored in the RAM 103 or the auxiliary storage unit 104. However, the POS terminal 100 may be transferred without the coupon issuing program. The coupon issuing program is recorded in a removable recording medium such as a magnetic disc, a magnetic optical disc, an optical disc or a semiconductor memory, or transferred via a network, and the coupon issuing program is written into the RAM 103 or the auxiliary storage device 104 of the POS terminal 100 which is separately transferred as described above.

The clock unit 105 carries out a timing action regularly to generate date and time information representing a date and a time. The clock unit 105 may be, for example, a TOD clock.

The input/output port 106 outputs a drive signal for driving a drawer 200 to the drawer 20 according to the drawer opening instruction of the CPU 101. The drawer 200, in which coupon money and coins are stored, is opened automatically after receiving the drive signal.

The communication interfaces 107-112 are respectively connected with the scanner 114, the keyboard 115, the touch panel for operator 116, the touch panel for customer 117, the internal printer 118 and the card reader 119. The communication interface 113 is connected with an external printer 300. The communication interfaces 107-113 interface the communication between the connected devices and the CPU 101. Devices based on well-known standards such as an RS (recommended standard)-232C, an PS/2, an USB (universal serial bus), an LVDS (low voltage differential signaling), an IEEE (institute of electrical and electronic engineers) 1284 (the so-called centronics specification) can be properly used as the communication interfaces. Typically, the communication interface 107 is a USB interface, the communication interface 108 is a PS/2 or USB interface, the communication interface 109 is an LVDS interface, the communication interface 110 is an RS-232C or USB interface, the communication interfaces 111 and 113 are IEEE1284 or USB interfaces, and the communication interface 112 is an RS-232C or USB interface.

The scanner 114 for reading the barcode printed on commodities and bills may include scanner of a fixed type or scanner of a handy type or scanner of the two types.

The keyboard 115 outputs a command representing the operation content from an operator.

The touch panel for operator 116 can display any image under the control of the CPU 101. The touch panel for operator 116 is used to display images representing various kinds of information which should be prompted to the operator. When the display screen of the touch panel for operator 116 is touched, the touch panel for operator 116 outputs position information representing the touched position.

The touch panel for customer 117 is, for example, an LCD (liquid crystal display) or a fluorescent tube display, and is capable of displaying any image under the control of the CPU 101. The touch panel for customer 117 is used to display images representing various kinds of information which should be prompted to the customer. When the display screen of the touch panel for customer 117 is touched, the touch panel for customer 117 outputs position information representing the touched position.

The internal printer 118 is, for example, a thermal printer or a dot impact printer, and prints bills such as a receipt.

The card reader 119 reads the data recorded in a credit card and the like.

The communication device 120 communicates with a store server 500 through an LAN (Local Area Network) 400. Further, the communication device 120 communicates with an electronic money server 700 through the LAN 400 and an Internet 600. The communication device 120 may be, for example, an existing LAN communication device.

The external printer 300 is, for example, a laser printer or an inkjet printer, and prints any image on any printing medium such as a coupon paper.

The store server 500 is arranged in a store where the POS terminal 100 is arranged. A multimedia station (MMS) 800 is also arranged in the store. Other POS terminals different from the POS terminal 100, other multimedia stations different from the multimedia station 800 or other terminals different from those mentioned above are sometimes arranged in the store. The store server 500 communicates with these terminals via the LAN 400 while carrying out processing such as managing each terminal and offering the data necessary for the processing of each terminal to each terminal.

The electronic money server 700 carries out various processing to provide server-managed electronic money service. Moreover, a plurality of electronic money servers 700 may be arranged for each issuer of electronic money (an operator of the electronic money service).

The multimedia station 800 is a terminal for a customer to carry out procedures for purchasing a ticket, a coupon or digital content. The customer carries out application procedures for the purchase of an electronic money coupon in the multimedia station 800.

Next, the actions of the POS terminal 100 having the configurations above are described.

Figure 2:
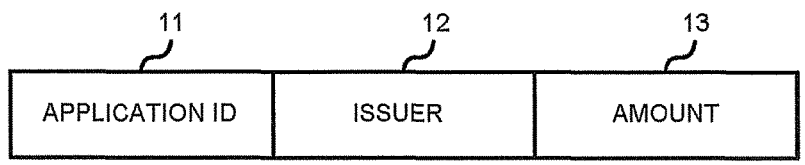
FIG. 2 is a diagram illustrating the structure of reception data.

In the application procedures for the purchase of an electronic money coupon, the issuer and the amount of electronic money are designated by the customer to the multimedia station 800. The multimedia station 800 notifies the store server 500 of the issuer and the amount. The store server 500 determines an application ID for identifying each application for the purchase of an electronic money coupon. Moreover, the store server 500, as shown in FIG. 2, creates reception data in which an application ID 11, an issuer 12 and an amount 13 are associated with each other and stores the reception data in an internal storage device. Further, the multimedia station 800 prints a reception bill representing a barcode representing the application ID.

Figure 3:
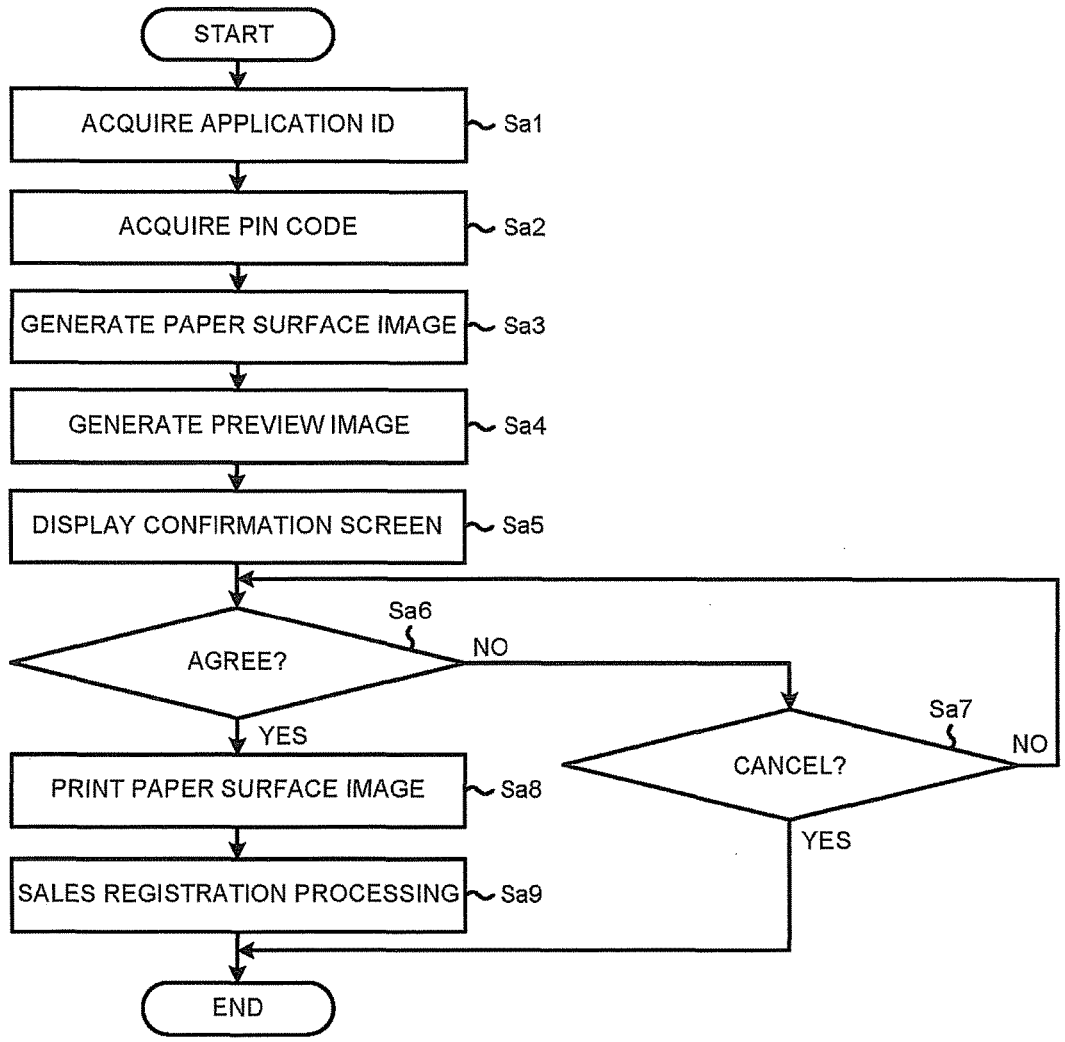
FIG. 3 is a flowchart illustrating a coupon issuing processing.

The customer presents the reception bill to a shop clerk. The shop clerk presses a specified key on the keyboard 115 to instruct the start of a coupon issuing job. Moreover, according to the instruction, the CPU 101 executes a coupon issuing processing as shown in FIG. 3 based on a coupon issuing program.

In ACT Sa1, the CPU 101 acquires an application ID. Specifically, after instructing the start of a coupon issuing job, the shop clerk operates the scanner 114 to read the barcode printed on a reception bill. By such an operation, the scanner 114 reads the barcode printed on the reception bill. Then, the CPU 101 acquires an application ID by analyzing the barcode read by the scanner 114.

In ACT Sa2, the CPU 101 acquires an identification code for settlement, which is an example of a right code for certifying the right for using electronic money. The identification code for settlement is also called as a prepaid ID or a PIN (personal identification number) code and is hereinafter referred to as a PIN code.

Specifically, for example, the CPU 101 notifies the store server 500 of the acquired application ID. Then, the store server 500 accesses the electronic money server 700 corresponding to the issuer contained in the reception data containing the application ID to request for the issuing of electronic money according to the amount contained in the reception data. After receiving the request, the electronic money server 700 determines a PIN code relating to the right for using the designated amount of electronic money and notifies the store server 500 of the PIN code. The store server 500 notifies the POS terminal 100 of the PIN code notified by the electronic money server 700. In this way, the CPU 101 acquires the PIN code notified by the store server 500 through the communication device 120. The CPU 101 further stores the acquired PIN code in the RAM 103 or the auxiliary storage unit 104.

Further, the procedures of the various processing described above is determined according to the system configuration providing a server-managed electronic money service and can be properly changed according to the system used.

In ACT Sa3, the CPU 101 generates a paper surface image representing the paper surface of an electronic money coupon. In this way, the CPU 101 functions as the first generation unit.

FIG. 4 is a diagram illustrating an example of a paper surface image 21.

As shown in FIG. 4, the paper surface image 21 contains a character string 21a visibly representing the PIN code (e.g. ABCD-1234-efgh-5678) acquired in ACT Sa2.

In ACT Sa4, the CPU 101 generates a preview image. As thus, the CPU 101 functions as the second generation unit.

In ACT Sa5, the CPU 101 controls the touch panel for customer 117 to display a confirmation screen containing the preview image. As thus, the CPU 101 functions as the display control unit.

FIG. 5 is a diagram illustrating an example of a confirmation screen 30.

As shown in FIG. 5, the confirmation screen 30 contains a preview image 31. The preview image 31 is an image in which the character string 21a in the paper surface image 21 is replaced by a character string 31a representing no PIN code (e.g. **----**). The character string 31a, which replaces all the characters of the PIN code with *, is an example of a dummy code. Further, as shown in FIG. 5, the confirmation screen 30 contains buttons 32 and 33.

In ACT Sa6, the CPU 101 confirms whether or not the customer agrees to issue an electronic money coupon. Moreover, if the result is determined to be NO, the CPU 101 proceeds to ACT Sa7.

In ACT Sa7, the CPU 101 confirms whether or not the customer cancels the issuing of an electronic money coupon. Moreover, if the result is determined to be NO, then the CPU 101 returns to ACT Sa6.

As thus, in ACT Sa6 and ACT Sa7, the CPU 101 waits for the result of the determination on whether or not the customer agrees to issue an electronic money coupon or whether or not the customer cancels the issuing of an electronic money coupon.

The customer views the preview image displayed by the touch panel for customer 117 to confirm whether or not the electronic money coupon the customer desires to purchase is right. A dummy code instead of a PIN code is displayed in the preview image. At this time, although the customer cannot confirm the PIN code, there is no need to confirm the PIN code. The reason is that the layout of an electronic money coupon will not changes as the number of digits of the dummy code is the same as that of a PIN code. Therefore, the customer can easily image the actually-issued electronic money coupon with the preview image. Furthermore, if the customer agrees to issue the electronic money coupon, the customer touches the button 32 on the confirmation screen 30 to input an intention of agreement. If the customer agrees to issue an electronic money coupon, the CPU 101 determines the result in ACT Sa6 to be YES and proceeds to ACT Sa8.

In ACT Sa8, the CPU 101 controls the external printer 300 to print the paper surface image on a printing medium for coupon papers. Thereby, the electronic money coupon on the surface of which the paper surface image is generated in ACT Sa4 is presented is issued by the external printer 300. As thus, the CPU 101 functions as the printer control unit. Further, the electronic money coupon issued in this way is one of the securities relating to the right obtained by customer paying a consideration.

In ACT Sa9, the CPU 101 carries out a sales registration processing relating to the electronic money coupon in order to carry out well-known settlement processing and sale management processing. As thus, the sales registration processing is one of the processing relating to the sales management of securities and the CPU 101 functions as a processing unit.

Sequentially, the CPU 191 ends the coupon issuing processing once the sales registration processing is completed.

Afterwards, the shop clerk delivers the electronic money coupon issued by the external printer 300 to the customer after receiving the consideration of the electronic money coupon from the customer. In the electronic money coupon, a PIN code is visibly represented instead of a dummy code. Thus, the customer can use electronic money by using the PIN code.

The customer, if desiring to cancel the issuing of the electronic money coupon after viewing the preview image 31, touches the button 33 to input an intention of canceling. In this way, if the customer cancels the issuing of an electronic money coupon, the CPU 101 determines the result of ACT Sa7 to be YES and ends the coupon issuing processing without executing ACT Sa8 and ACT Sa9. In this case, a log is stored for confirming that the issuing is cancelled by the customer later. Any one, a combination of or all of the issuer, the PIN code and the cancel time of the electronic money coupon the issuing of which is cancelled and the code for specifying the POS terminal are contained in the log.

As stated above, by using the POS terminal 100, the customer can confirm the preview image representing the appearance of an electronic money coupon before the electronic money coupon is actually issued. Then, an electronic money coupon is issued if the customer agrees to issue the electronic money coupon after a confirmation, that is, the customer requests for the issuing of the electronic money coupon.

Therefore, the trouble occurring during the delivery of an electronic money coupon to the customer or the reception of the consideration of an electronic money coupon, for example, the trouble occurring from the difference between any one or a plurality of electronic money (virtual currency), the operator of an electronic money service (the provider of a virtual currency service) and the monetary value of the purchased virtual currency and that or those desired, is greatly decreased.

The aforementioned commodity transaction is the sales of an electronic money coupon; however, a PIN code is more valuable than an electronic money coupon since electronic money can be used with a PIN code even if there is no electronic money coupon. Thus, if the preview image containing a PIN code is captured by the customer with a digital camera, it is possible that electronic money is used illegally since the customer has the PIN code even if the issuing of an electronic money coupon is cancelled.

However, by using the POS terminal 100, a dummy code instead of a PIN code is displayed in the preview image, thus, the customer cannot get a PIN code before getting an electronic money coupon, which prevents the aforementioned illegal action. Moreover, the dummy code may be a code disenabling a PIN code, thus, the forms of the dummy code are various such as a dummy code masking part of the digits constituting an effective PIN code.

This embodiment may be embodied as the following transformations.

A preview image may be displayed by a display device externally connected with the POS terminal 100. The touch panel for customer 117 may be a panel externally connected with the POS terminal 100.

The printer for printing a paper surface image on a printing medium may be arranged in the POS terminal 100.

A paper surface image and a preview image may be generated by the store server 500 or the electronic money server 700. In this case, the store server 500 or the electronic money server 700 sends the paper surface image and the preview image to the POS terminal 100, and the POS terminal 100 executes ACT Sa5 and ACT Sa8 using the received paper surface image and preview image. Moreover, a paper surface image and a preview image may be generated by a server excluding the store server 500 and the electronic money server 700. Further, a paper surface image and a preview image may be respectively generated by different servers. In addition, a paper surface image may be generated by a server while a preview image may be generated by the POS terminal 100.

Personal information such as the name of the customer may be visibly represented in an electronic money coupon. In this case, a preview image can be generated without displaying the personal information.

The electronic money coupon issuing processing is ended when the customer cancels the issuing of the electronic money coupon after viewing the preview image, however, in order to issue another electronic money coupon, the system may wait so as to obtain an application ID for another electronic money.

The application is applicable to issuing a valuable instrument relating to a right excluding the right for using electronic money.

The application is applicable to a sales processing apparatus such as an electronic cash register excluding a POS terminal.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A sales processing apparatus, comprising:
   a first generation unit configured to generate a paper surface image of a valuable instrument including a right code necessary for exercising a right to be printed being identifiable, the valuable instrument relating to the right obtained by a customer paying a consideration;
   a second generation unit configured to generate a preview image including information represented by the paper surface image and a replacing code, in which the replacing code replaces the right code represented by the paper surface image, the right code is made non-identifiable, and information other than the right code in the information represented by the paper surface image is made identifiable in the preview image;
   a display control unit configured to control a display device to display the preview image; and
   a printer control unit configured to control a printer to print the paper surface image on a printing medium in response to a request for issuing a valuable instrument of the surface representing by the preview image displayed by the display device.

2. The sales processing apparatus according to claim 1, further comprising:
   a processing unit configured to execute a processing relating to the sales management of the valuable instrument in response to the printing of the paper surface image on the printing medium by the printer.

3. The sales processing apparatus according to claim 1, wherein
   the right code is identification information for identifying the right for using server-managed electronic money.

4. The sales processing apparatus according to claim 1, wherein
   the first generation unit generates the paper surface image including first personal information of the customer to be printed being identifiable in addition to the right code; and
   the second generation unit generates the preview image including second personal information in addition to the replacing code, in which the second personal information replaces the first personal information, the right code and the first personal information represented by the paper are made non-identifiable, and information other than the right code and the first personal information in the information represented by the paper surface is made identifiable.

5. The sales processing apparatus according to claim 1, wherein
   the second generation unit makes the right code non-identifiable by replacing the right code with the replacing code.

6. The sales processing apparatus according to claim 5, wherein
   the second generation unit uses the same number of digits as the right code for the replacing code.

7. The sales processing apparatus according to claim 1, wherein the replacing code comprises other information that inhibits the exercise of the right.

8. A sales processing method, comprising:
   generating a paper surface image of a valuable instrument including a right code necessary for exercising a right to be printed being identifiable, the valuable instrument relating to the right obtained by a customer paying a consideration;
   generating a preview image including information represented by the paper surface image and a replacing code, in which the replacing code replaces the right code represented by the paper surface image, the right code is made non-identifiable, and information other than the right code in the information represented by the paper surface image is made identifiable in the preview image;
   controlling a display device to display the preview image; and
   controlling a printer to print the paper surface image on a printing medium in response to a request for issuing a valuable instrument of the surface representing by the preview image displayed by the display device.

9. A sales processing system including a server apparatus and a sales processing apparatus connected with a display device and a printer, the server apparatus includes:
   a first generation unit configured to generate a paper surface image of a valuable instrument including a right code necessary for exercising a right to be printed being identifiable, the valuable instrument relating to the right obtained by a customer paying a consideration; and a second generation unit configured to generate a preview image including information represented by the paper surface image and a replacing code, in which the replacing code replaces the right code represented by the paper surface image, the right code is made non-identifiable, and information other than the right code in the information represented by the paper surface image is made identifiable in the preview image, wherein the sales processing apparatus includes:

a first reception unit configured to receive the preview image sent by the first sending unit;

a display control unit configured to control a display device to display the preview image received by the first reception unit; and a notification unit configured to notify the server apparatus of a request for issuing of a valuable instrument the surface of which is represented by the preview image displayed by the display device;

the server apparatus further includes:

a second sending unit configured to send the paper surface image to the sales processing apparatus according to the notice from the notification unit; and the sales processing apparatus further includes:

a second reception unit configured to receive the paper surface image sent by the second sending unit; and a printer control unit configured to control the printer to print the paper surface image received by the second reception unit on a printing medium.

* * * * *